United States Patent [19]

Berkowitz et al.

[11] 3,736,500

[45] May 29, 1973

[54] LIQUID IDENTIFICATION USING MAGNETIC PARTICLES HAVING A PRESELECTED CURIE TEMPERATURE

[75] Inventors: Ami E. Berkowitz, Schenectady; William H. Meiklejohn, Scotia, both of N.Y.

[73] Assignee: General Electric Company, Schenectady, N.Y.

[22] Filed: Oct. 26, 1971

[21] Appl. No.: 192,246

[52] U.S. Cl. ..........................324/34 R, 44/51, 44/59, 73/53, 252/62.51
[51] Int. Cl. ..............................................G01r 33/12
[58] Field of Search .......................324/34 R, 34 TE; 252/62.51, 62.52; 73/53; 250/106 T; 44/59, 51

[56] References Cited

UNITED STATES PATENTS

| | | | |
|---|---|---|---|
| 1,323,824 | 12/1919 | Brueckner | 324/34 TE |
| 1,787,995 | 1/1931 | Reilly | 44/59 |
| 2,926,343 | 2/1960 | Postal | 324/34 R |
| 3,574,550 | 4/1971 | Scott et al. | 250/106 T |

OTHER PUBLICATIONS

Magnetic System Picks Up Oil From Spills; C & EN; Feb. 1, 1971; pp. 47–48.
Coded Microspheres Could Tag Oil; C & EN; April 1971; p. 65.

*Primary Examiner*—Robert J. Corcoran
*Attorney*—John F. Ahern, Jerome C. Squillaro, Frank L. Neuhauser et al.

[57] ABSTRACT

Methods are disclosed for uniquely identifying liquids so that a particular liquid may be distinguished from other similar liquids. In one embodiment, an identification tag comprising sub-micron size magnetic particles of at least one pre-selected-Curie temperature is introduced into the liquid to be tagged. That liquid is then distinguishable from other similar liquids by its unique identification tag. Identification of a particular liquid, such as crude oil, for example, is then achieved by detecting the presence of the previously introduced identification tag. In the event of an "oil spill," for example, the party liable for the spill can then be readily determined, merely by measuring the Curie temperatures of magnetic particles extracted from a sample of the spilled oil.

15 Claims, 2 Drawing Figures

PATENTED MAY 29 1973 3,736,500

- DISPERSE MAGNETIC PARTICLES OF KNOWN CURIE TEMPERATURES INTO LIQUID TO BE TAGGED
- COLLECT AND CONCENTRATE MAGNETIC PARTICLES FROM SAMPLE OF LIQUID TO BE IDENTIFIED
- DETECT CURIE TEMPERATURES OF MAGNETIC PARTICLES
- ANALYZE CHEMICALLY, IF NECESSARY

LIQUID IDENTIFICATION USING MAGNETIC PARTICLES HAVING A PRESELECTED CURIE TEMPERATURE

The present invention relates to identification systems and more particularly to methods and apparatus for uniquely identifying or tagging a particular liquid so that it may be distinguished from other similar liquids.

Identification of sources of pollution and those responsible for the pollution has become exceedingly important in recent years. For example, oil pollution from drilling operations or pipeline and marine transportation has caused considerable damage to shoreline areas. As a result, considerable sums of money have been spent in clean-up operations. In some cases, however, the source of the oil spill and those responsible are not easily determined. In fact, the identification of polluters becomes exceedingly difficult, if not impossible, in those situations where cargo vessels and tankers dump oily ballast or pump bilges into offshore waters.

The need for a simple and inexpensive method for identifying the source of pollution is therefore exceedingly important. One proposed system for identifying the source of oil pollution, for example, employs oil soluble tags, such as organo-metallics and halogenated aromatic polycycles. Certain aspects of this proposal, however, pose restrictions on the ultimate operational utility. For example, in the case of organo-metallic tags, multiple oil spills or multiple oil tagging situations may result in chemical reactions between the various tags and hence make identification of the source exceedingly difficult, if not impossible.

Another proposal utilizes microspheroid (10-50 microns) particles suspended in the oil. A serious limitation of this proposal, however, is that collection and separation of the particles is complicated and arduous for single, not along multiple spills. Further, it is exceedingly difficult to suspend particles of that size in oil. Therefore, these problems have limited the usefulness of such oil identification systems.

It is therefore an object of this invention to overcome the foregoing problems and provide a simple and inexpensive method and apparatus for identifying or tagging a liquid, such as oil, so that it may be subsequently identified and distinguished from oil of a different source.

It is yet another object of this invention to provide readily distinguishable and unique identification tags to similar liquids so that the source of a particular liquid can be identified.

It is still another object of this invention to provide a method for identifying the source of a particular liquid by detecting the presence of a previously introduced identification tag with a high degree of accuracy.

Briefly, and in accord with one embodiment of our invention, an identification tag comprising sub-micron size magnetic particles of at least one pre-selected Curie temperature are introduced into a liquid to be tagged. Identification of the particular liquid would then comprise measuring the Curie temperature of the particles to determine the identification tag for the particular liquid. In the case of oil slick identification, for example, the inclusion of sub-micron magnetic particles of selected Curie temperature into the oil at a point prior to its spillage, permits subsequent identification of the oil company or carrier responsible for the particular oil spill. The availability of a large number of magnetic particles with different Curie temperatures advantageously permits a large coding vocabulary. In accord with one aspect of our invention, sub-micron size magnetic particles when introduced into crude oil, for example, with a concentration of between approximately one and ten parts per million, are easily collected and concentrated for subsequent identification.

In accord with another aspect of our invention, an identification tag of magnetic particles of different Curie temperatures is determined by measuring the susceptibility of the particles as a function of temperature. In a magnetic circuit, for example, the susceptibilty exhibits a sharp peak at the Curie temperature. Accordingly, determination of the Curie temperatures of the particles introduced into the crude oil provides ready identification of the source of the crude oil.

Magnetic materials which are particularly suitable for practicing our invention are those which exhibit stable characteristics in their intended environment and which can be made into small particles capable of being suspended in the liquid to be tagged. Suitable materials include oxides, such as, for example, ferrites, perovskites, chromites and magnetoplumbites. Also, ferromagnetic, ferrimagnetic, superparamagnetic and other useful materials may be used in practicing our invention.

The novel features believed characteristic of the present invention are set forth in the appended claims. The invention itself, together with further objects and advantages thereof, may be best understood with reference to the following detailed description taken in connection with the accompanying drawings in which:

Figure 1:
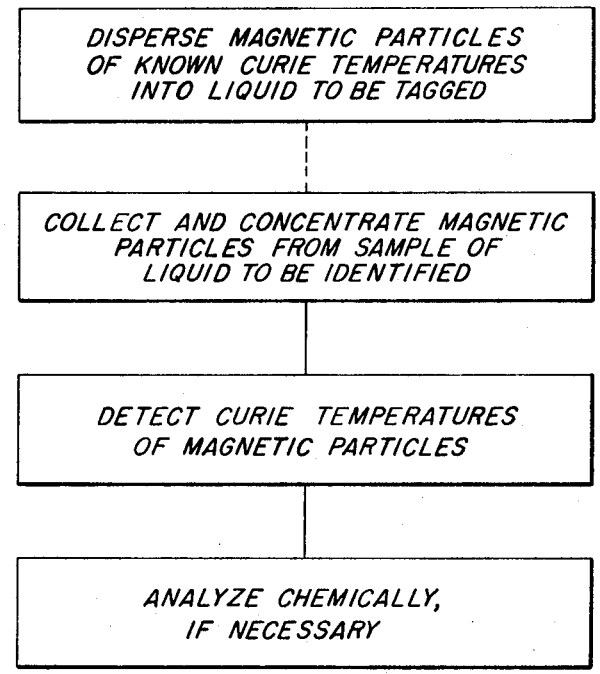
FIG. 1 is a flow diagram illustrative of one embodiment of our invention.

The practice of our invention is exemplified in the flow diagram of FIG. 1 wherein magnetic particles of known Curie temperatures are dispersed into a liquid to be tagged. Since one of the primary liquids to be identified is oil and oil products, our description of the invention is in the context of an oil identification system. However, it is to be understood that other liquids and even liquids containing solid particles, such as industrial waste products and sewage, for example, may be similarly identified. Accordingly, our invention is not limited to oil identification and by the term "liquid" we intend to encompass all such liquids which are advantageously identified by the dispersion of magnetic particles of selected Curie temperatures therein.

The tagging or identification of oil, for example, by the inclusion of magnetic particles of selected Curie temperatures therein is based on the knowledge that all magnetic particles exhibit a definite transition temperature at which the intrinsic phenomenon of magnetism disappears and the substance becomes paramagnetic. The temperature at which this transition occurs is called the Curie point and is usually lower than the melting point of the substance. Furthermore, the existence of a large number of magnetic materials, each having a unique Curie temperature, permits the use of a large number of magnetic materials for liquid identification.

Magnetic materials having Curie temperatures ranging from between approximately 25°C and 500°C, for example, are particularly useful in practicing our invention with respect to oil identification, however, our invention is not necessarily limited to materials within this range. For example, ferrites (i.e., those materials with the spinel crystal structures having the general formula $MFe_2O_4$, where M is any divalent metallic ion having the proper ionic radius to fit in the spinel structure) are particularly suited for tagging oil since they are highly stable in oil.

Numerous materials having the general formula indicated above are enumerated on pages 4–36 of Reference Data for Radio Engineers, Fifth Edition, by Howard W. Sams & Co., Inc., Library of Congress Catalog No. 43-14665. Typical materials include $NiFe_2O_4$, $Ni_xZn_{(1-x)}Fe_2O_4$ where $x$ varies from zero to one, $MnFe_2O_4$, $Mn_xZn_{(1-x)}Fe_2O_4$ where $x$ varies from zero to one, $CuFe_2O_4$, $MgFe_2O_4$, $CoFe_2O_4$, etc. Other materials, however, may be more suitable for tagging other liquids, such as bulk-handled liquid chemicals, industrial wastes, sewage water or kerosene, for example, and hence the foregoing list is for purposes of illustration and not by way of limitation.

Another desirable attribute of magnetic materials, such as ferrites, is that the magnetic properties of the material remain substantially unchanged even for particle sizes substantially less than one micron, for example. This characteristic is particularly useful in the practice of our invention since it is desirable to employ a particle size which allows the particles to remain in suspension in the liquid. For crude oil, for example, the particle size is advantageously less than 1,000 Angstroms and preferably between approximately 10 and 300 Angstroms. Particles of this size are readily produced by grinding or by precipitation from aqueous salt solutions, for example.

Additionally, the magnetic particles may be individually coated with at least a monomolecular layer of a surfactant which exhibits an affinity to the individual particles and to the liquid in which the particles are suspended. Suitable surfactants for this purpose are well known to those skilled in the art. For example, a surfactant suitable for the suspension of ferrites in crude oil is Enjay-3584, manufactured by Enjay Chemicals Company. Other surfactants having the aforementioned characteristics may also be employed, if desired, without departing from the spirit and scope of our invention.

After preparing magnetic particles of suitable size for suspension in the oil and coating the particles with a surfactant, the particles are then introduced into the oil in sufficient concentration so that subsequently they may be collected and concentrated from a sample of the oil. In accord with our invention, we have found that a concentration of magnetic particles of between approximately one and ten parts per million by weight in oil is suitable for subsequent collection, and detection. Lesser concentrations may be used if desired, but larger oil samples are required to effect identification. Also, greater concentrations may be used, if desired, but this merely increases the cost of the system without any appreciable benefits, hence, one to ten parts per million is an economical range of particle concentration for oil identification, for example.

For purposes of illustration, let it be assumed that it is desired to uniquely identify a certain quantity of crude oil to be transported from one location to another, such as, by an oil tanker, for example. This may be conveniently accomplished, for example, by introducing the magnetic particles into the tanker as it is being filled with crude oil. The magnetic particles introduced into the crude oil may, for example, be $MnFe_2O_4$ having a Curie temperature of 300°C. Alternately, and as will be pointed out more fully below, additional magnetic particles of different chemical composition and having different Curie temperatures may also be introduced so that the identification tag for a particular liquid may comprise magnetic particles having several different Curie temperatures. In this way, a large number of identification tags which uniquely identify particular liquids are possible. However, for purposes of this illustration, assume that only one type magnetic material having a single Curie temperature is employed.

If, during the course of transportation, crude oil should be spilled into a body of water, such as an ocean, lake or river, the identity of the carrier causing the oil spill can be determined by collecting a sample of the magnetic particles in the spilled oil. In accord with our invention, the collection and concentration of magnetic particle identification tags may be readily accomplished by imposing a magnetic field gradient upon a segment of the oil spill area. For example, in the case of a recent oil spill, merely skimming the oil-water interface with a permanent magnet would suffice. In other cases, where the oil spill may have become viscous and asphalt-like, it may be necessary to collect specific quantities of the oil residues and to decrease the viscosity with an appropriate solvent before effecting a magnetic particle separation. In this latter situation, suitable solvents, such as hydrocarbons and chlorinated hydrocarbons, may be used and the magnetic particles then removed by the use of a permanent magnet or an electromagnet, for example. The magnets may, for example, be covered with a removable plastic coating to more easily recover the particles from the surface of the magnet.

Those skilled in the art can readily appreciate that the force required to collect magnetic particles is determined by the product of the magnetic moment per unit volume of the particle, the volume of the particle and the magnetic field gradient. Accordingly, the force required to remove or collect magnetic particles of a known size can be readily determined. In addition to magnetically collecting particles, centrifuging and floculation may also be employed if desired without departing from the spirit and scope of our invention.

Figure 2:
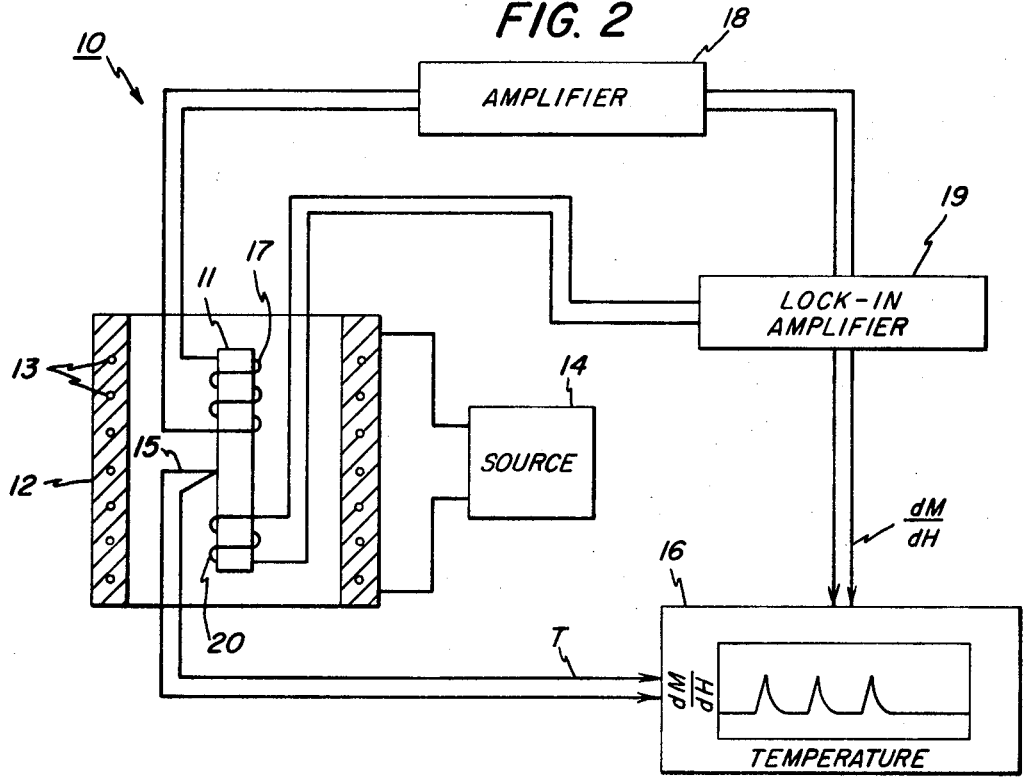
FIG. 2 is an electrical block diagram of suitable apparatus for detecting the Curie temperature of magnetic particles.

After collecting and concentrating the magnetic particles into a sample, the Curie temperature of the magnetic particles is then determined. This may be readily accomplished by measuring the susceptibility of the magnetic particles as a function of temperature. This measurement may be performed in various ways by suitable apparatus, some of which are described below. For example, FIG. 2 illustrates a magnetic circuit for displaying the susceptibility as a function of temperature. A sharp peak occurs at the Curie temperature of the magnetic particle. Where multiple identification tags (i.e., more than one type magnetic particle each having different Curie temperatures) are employed, the susceptibility as a function of temperature will exhibit amplitude peaks at each Curie temperature. In this way, the identification tag ascribed to certain bulk oil can be determined and hence the source of the oil also determined.

In the case of multiple oil spills and multiple identification tags, the amplitude peaks in susceptibility as a function of temperature would be proportional to the relative concentrations of the different tags present in the sample. Hence, in addition to being able to identify the sources of the oil spill, the relative contributions of each oil spill with respect to the sample collected could also be determined.

The measurement of Curie temperature by the change in susceptibility as a function of temperature provides an accurate indication of the identification tag for most samples tested. However, in situations where ambiguities may arise, the collected particles may be further analyzed by chemical composition and crystal (lattice) structure. For example, atomic absorption, X-ray emission and neutron diffraction may be used to provide unequivocal identification of the magnetic particles contained in the sample.

FIG. 2 illustrates suitable apparatus 10 for measuring and indicating the Curie temperature or temperatures of magnetic particles. The measuring apparatus 10 includes a magnetic circuit in which the magnetic particles are placed in a container 11 which itself is positioned within a furnace 12 comprising heating coils 13 for heating the container 11 and its contents. The heating coils 13 are connected to a suitable source 14 such as an RF source, an electrical source or other suitable means for controllably varying the temperature of the furnace 12.

The temperature of the container 11, which is also essentially the temperature of the magnetic particles contained therein, is sensed by a transducer element 15, such as a thermocouple which provides a temperature dependent voltage signal to an indicating device 16, such as an X-Y strip recorder. A magnetic field is provided around the container 11 by an electrical signal applied to the magnetizing coil 17 from an amplifier 18 having its input connected to the output of a lock-in amplifier 19. The amplifier 19 provides a magnetizing current, such as an 80 Hertz signal to the magnetizing coil 17 (through amplifier 18) of sufficient amplitude to produce a magnetic field strength of between approximately 50 and 100 Oersteds, for example.

The container 11 is also provided with a signal sensing coil 20 for sensing the change in magnetization as the temperature of the magnetic particles is increased above the Curie temperature of the particles. The output of the sensing coil 20 is connected to the amplifier 19 which provides an output signal proportional to the rate of change in flux density with respect to magnetic field strength, $dM/dH$. By definition, this output signal is the susceptibility of the magnetic particles. Hence the indicating device 16 provides a display of susceptibility as a function of temperature for the magnetic particles. The abrupt change in susceptibility at the Curie temperature of the magnetic particles therefore provides an accurate means for measuring the Curie temperature of the magnetic particles and hence ready identification of the magnetic particles.

Operationally, a sample of magnetic particles (such as those gathered from an oil slick) is placed in the container 11 and a magnetic field is created by energizing the magnetizing coil 17. The furnace 12 is then raised in temperature at a suitable rate, such as 10° per minute, for example, and the indicating device 16 is permitted to plot the susceptibility as a function of temperature. Each voltage peak is then an indication of the Curie temperature or temperatures of the magnetic particles contained in the sample. By comparing the Curie temperatures with a chart of magnetic particles and their Curie temperatures, it is possible to determine the composition of the sample and also identify the source of the sample.

Alternate methods and apparatus for measuring the Curie temperatures may also be employed, if desired. For example, for superparamagnetic particles, the susceptibility may be measured in any suitable way and by suitable electrical means, the square root of the product of susceptibility and temperature is taken. The result is then proportional to magnetization at that temperature. By subsequent differentiation with respect to temperature and then plotting this signal as a function of temperature, the Curie temperature is indicated by voltage peaks.

Those skilled in the art can readily appreciate that still other methods for measuring or determining the Curie temperature of magnetic particles may also be employed. Accordingly, the foregoing examples of specific methods and apparatus for measuring the Curie temperature are by way of example and are not intended to limit the scope of the present invention. In fact, any method which effectively indicates the Curie temperature of the sample may be employed, if desired.

The following specific examples of the practice of our invention are given by way of illustration and not by way of limitation so that those skilled in the art may better understand our invention. In the examples, temperatures are in degrees Centigrade.

EXAMPLE 1

Approximately 10 milligrams of $Ni_{0.4}Zn_{0.6}Fe_2O_4$ particles of approximately 100 Angstroms diameter prepared by grinding, are coated with a surfactant, Enjay-3584, and added to approximately one liter of crude oil. This produces a concentration of approximately 10 parts per million by weight. The particles are thoroughly mixed therein by stirring and remain suspended in the oil. The particles are then extracted from the oil by passing a magnet through the oil. The collected particles are washed in a solvent to remove the residual oil and the particles are placed in a container, such as is illustrated in FIG. 2. The temperature of the particles is increased and the susceptibility as a function of temperature is plotted on an X-Y recorder. An abrupt change in susceptibility occurs at 190°, indicating the Curie temperature of the particles. From a chart of the magnetic properties of materials, the magnetic particles are identified as $Ni_{0.4}Zn_{0.6}Fe_2O_4$.

EXAMPLE 2

Magnetic particles of $MnFe_2O_4$, coated with a surfactant, are introduced into crude oil in a concentration of approximately five parts per million. A sample of the magnetic particles are extracted with an electromagnet and separated from the oil by washing. The sample of magnetic particles is placed in a container, similar to that illustrated in FIG. 2 and the susceptibility as a function of temperature is recorded. An abrupt change in susceptibility occurs at 300°, identifying the magnetic particles as $MnFe_2O_4$.

The foregoing examples illustrate numerous advantages of our invention over prior art methods for identifying bulk-handled liquids. For example, the use of low concentrations of magnetic particles permits identifying or tagging of bulk-handled liquids at very low costs. This is a particularly significant advantage of our invention since billions of barrels of oil, for example, are transported annually by oil tankers, for example. Further, since the particle concentration levels are relatively low, in many cases it is unnecessary to remove the particles prior to ultimate use of the liquids. However, if desired, the magnetic particles may be removed by suitable magnetic or electromagnetic apparatus.

Another advantage of our invention is the large coding vocabulary available for liquid identification. For example, binary coding may be employed, if desired, producing $2^N-1$ possible combinations. Alternately, the coding may take the general form $$C_{N,r} = N!/r! \; (N-r)!$$

where $C$ is the number of combinations, $N$ is the number of different type magnetic particles and $r$ is the number of different type particles in the combination. Also, a coding vocabulary of $(N-1)+(N-2)+(N-3)+\ldots+(N-N)$ two-component different codes may be employed, if desired. However, three and even four or more component codes may also be employed. Accordingly, a large number of easily identifiable codes are available for tagging liquids.

Those skilled in the art can readily appreciate that an additional tag may be added to a liquid at various points from its original source to its final destination. For example, in the transportation of bulk crude oil, a single identification tag may be employed. After shipment to a desired intermediate destination, an additional tag may be added to the oil and after still another intermediate destination is reached, yet a third tag added to the oil. In this way, any oil spillage and subsequent pollution may be readily identified and those responsible for the pollution can also be identified.

Still another advantage of our invention is the high degree of sensitivity and accuracy of magnetic particle detection which is achieved with relatively simple apparatus. As a result, it becomes relatively simple to identify the source of pollution with simple portable equipment. In cases of possible ambiguity, collected samples may be laboratory analyzed for more accurate identification and positive verification of the source of pollution. Methods and apparatus for performing this analytical analysis are well known to those skIlled in the art.

In view of the foregoing, it is apparent that many modifications and changes may be made to our invention without departing from the spirit and scope thereof. Accordingly, we intend, by the appended claims, to cover all such modifications and changes as fall within the spirit and scope of our present invention.

What we claim as new and desire to secure by Letters Patent of the United States is:

1. A method for identifying the source of an unknown liquid having at least one type of magnetic particle of preselected Curie temperature dispersed therein, said method comprising:
   removing at least some of the magnetic particles from the liquid to produce a concentrated sample of the magnetic particles; and
   measuring the Curie temperature of the concentrated sample of magnetic particles to identify the type of magnetic particle and hence the source of the liquid.

2. The method of claim 1 wherein the step of removing the magnetic particles includes:
   passing magnetic collecting means through the liquids; and
   collecting the particles which attach themselves to the magnetic collecting means.

3. The method of claim 1 wherein the step of measuring the Curie temperature includes:
   measuring the susceptibility of the particles as a function of temperature; and
   determining the temperature at which a maximum susceptibilty is obtained.

4. The method of claim 1 wherein said liquid is spilled crude oil and the magnetic particles are introduced at the time of preparing the oil for shipment.

5. A method of providing a unique identification tag to a particular liquid so that it may be distinguished from similar liquids, said method comprising:
   dispersing within said liquid magnetic particles of at least one preselected Curie temperature.

6. The method of claim 5 wherein said particles are suspended within said liquid by coating said particles with a surfactant which attaches itself to the particles and to the liquid.

7. The method of claim 6 wherein said liquid is crude oil and said particles are between approximately 10 and 300 Angstroms in diameter.

8. The method of claim 5 wherein said particles comprise different type magnetic materials of different preselected Curie temperatures.

9. The method of claim 5 wherein said magnetic particles are selected from the group consisting of ferrites, pervoskites, chromites and magnetoplumbites.

10. The method of claim 5 wherein said particles have a concentration by weight of between approximately one and ten parts per million.

11. A method of identifying a party liable for damage caused by release of a contaminating liquid in a body of water, said method comprising:
   introducing magnetic particles of preselected Curie temperature into said liquid prior to release of said liquid into a body of water;
   extracting said magnetic particles frOm a sample of said liquid released into said body of water; and
   measuring the Curie temperature of the extracted particles to identify the source of the contaminating liquid and hence the partly liable for releasing the contaminating liquid into the body of water.

12. The method of claim 11 wherein said magnetic particles are selected from the group consisting of ferrites, pervoskites, chromites and magnetoplumbites.

13. The method of claim 12 wherein the selected particleS are suspended in the contaminating liquid.

14. The method of claim 13 wherein the selected particles are between approximately 10 and 300 Angstroms in diameter.

15. The method of claim 14 wherein the particles are introduced into the contaminating liquid in a concentration of between approximately one and ten parts per million by weight.

* * * * *